United States Patent [19]

Morris et al.

[11] Patent Number: 4,479,663
[45] Date of Patent: Oct. 30, 1984

[54] HANDLEBAR MOUNTING FOR A FAIRING

[76] Inventors: Lewis R. Morris; Timothy M. Sullivan; James L. Sharp, all of c/o First Champaign Corporation, P.O. Box 927, Rantoul, Ill. 61866

[21] Appl. No.: 382,183

[22] Filed: May 26, 1982

[51] Int. Cl.³ .............................................. B62J 17/02
[52] U.S. Cl. .............................. 280/289 H; 296/78.1; 296/84 N
[58] Field of Search ........... 280/289 R, 289 H, 289 S; 296/78.1, 84 H, 84 N

[56] References Cited

U.S. PATENT DOCUMENTS

| Re. 23,039 | 9/1948 | Comiskey, Sr. | 296/78.1 |
| 4,010,976 | 3/1977 | Shields | 296/78.1 |
| 4,082,345 | 4/1978 | Willey | 296/78.1 |

FOREIGN PATENT DOCUMENTS

| 930733 | 7/1955 | Fed. Rep. of Germany | 296/78.1 |
| 241692 | 10/1925 | United Kingdom | 296/78.1 |
| 701934 | 1/1954 | United Kingdom | 296/78.1 |
| 720104 | 12/1954 | United Kingdom | 296/78.1 |
| 741877 | 12/1955 | United Kingdom | 296/78.1 |

Primary Examiner—Joseph F. Peters, Jr.
Assistant Examiner—Kenneth R. Rice
Attorney, Agent, or Firm—Wood, Dalton, Phillips, Mason & Rowe

[57] ABSTRACT

A mounting for a motorcycle fairing, which mounting permits both translational and angular orientation of the fairing relative to the motorcycle. A pair of flat elongate links at the lower forward portion of the fairing, each having a longitudinal slot, are spaced and joined pivotally at one end to the inside of the fairing. The links are crossed over each other and a bolt extends laterally through the opening formed at the intersection of the slots and is secured to the vehicle headlight on each side thereof. A pair of rods are secured at an upper portion of the fairing and extend downwardly and rearwardly therefrom with each end mating with a clamp on the motorcycle handlebars. The length and orientation of the rods between the clamps and the fairing is adjustable so as to accommodate fore-and-aft and angular movement of the fairing, which movement is made possible by the arrangement of the forward mounting links.

16 Claims, 5 Drawing Figures

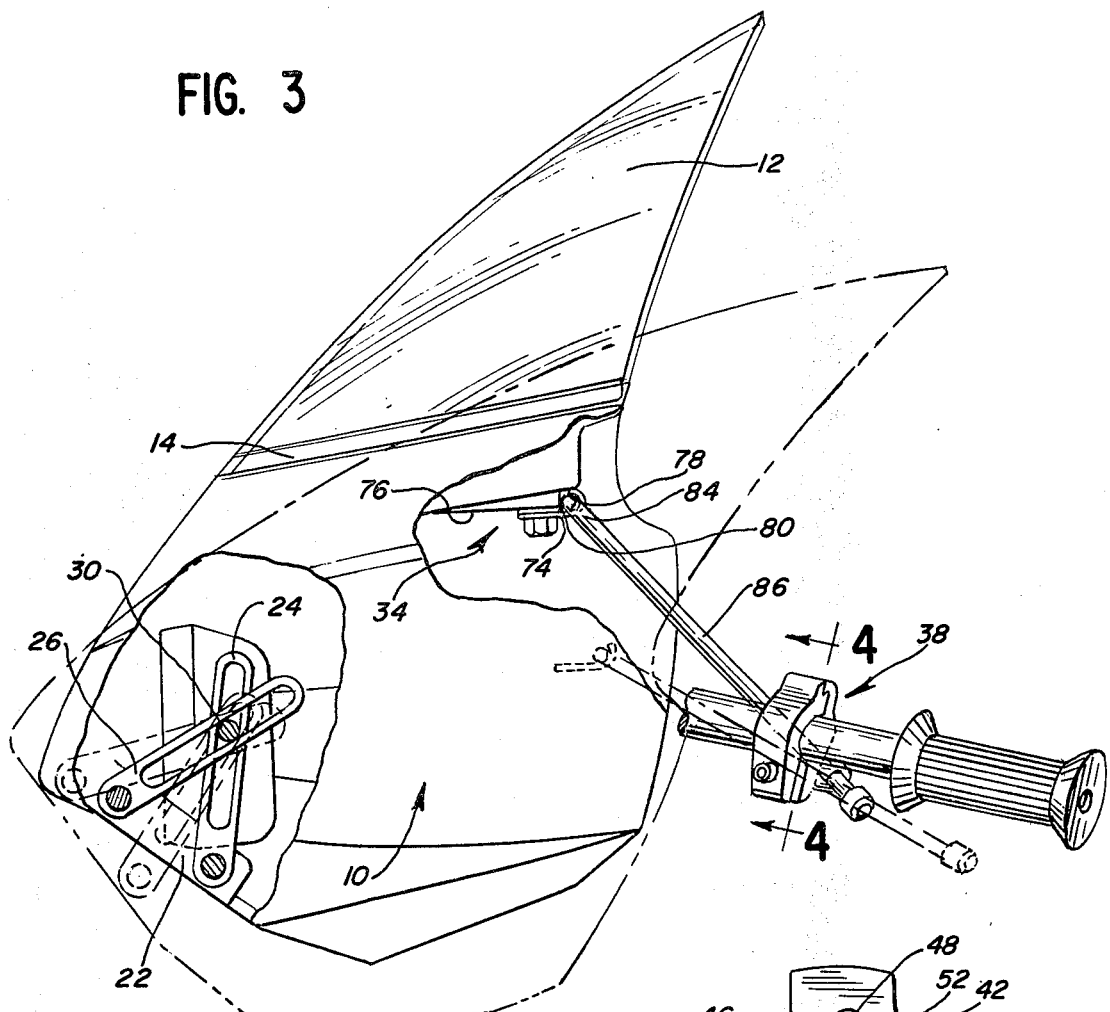
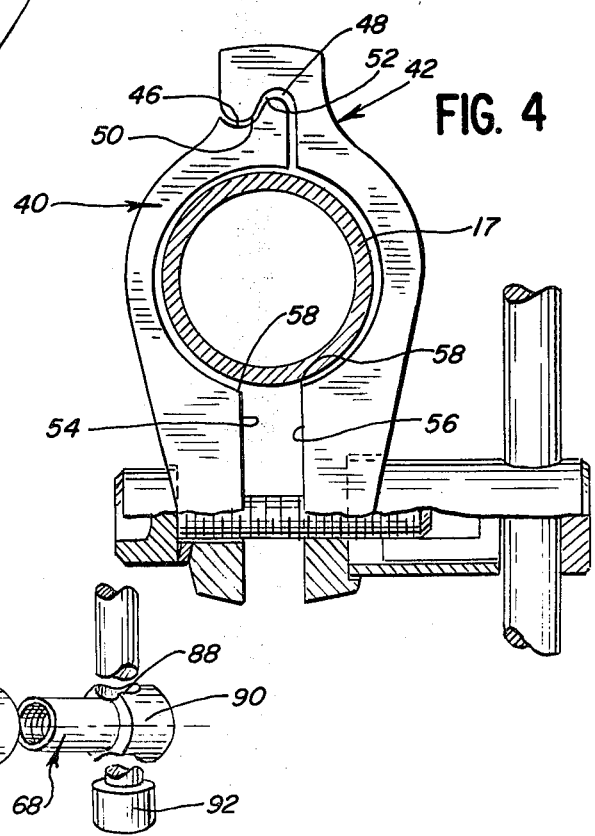
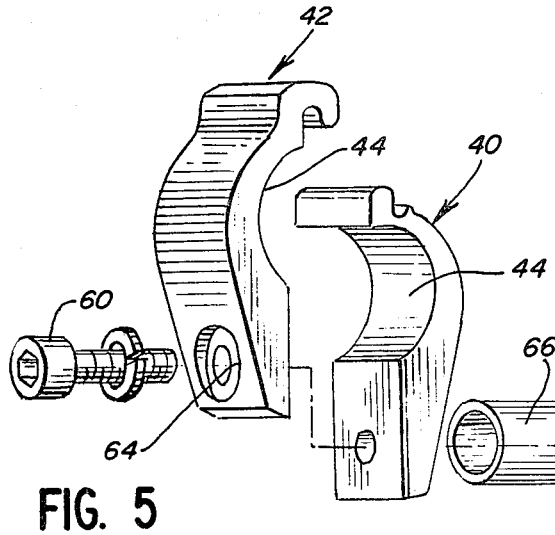

HANDLEBAR MOUNTING FOR A FAIRING

BACKGROUND OF THE INVENTION

This invention is concerned with a novel handlebar mounted motorcycle fairing which is adjustable rotationally and translationally on the motorcycle.

SUMMARY OF THE INVENTION

In accordance with the present invention, the fairing has a mounting assembly which includes a means at the forward portion of the fairing, mating with the vehicle in such a manner that the fairing can be translated and rotated relative to the vehicle headlight. Toward the rear of the fairing, and adjacent the upper region thereof, is a brace which extends toward the handlebars and is engaged by a clamping assembly to stabilize the fairing and accommodate the fairing movement.

It is the principal object of the present invention to provide a versatile fairing mounting assembly that permits rotational movement as well as fore-and-aft and/or vertical adjustment of the fairing relative to the motorcycle so that the fairing might be oriented as desired. In a preferred form of the invention, at least two flat links, each with an elongate slot, join the fairing with the vehicle headlight. The links are pivotally secured at spaced positions on vertically disposed longitudinal flanges at the inside of the fairing. Preferably, a flange is provided on each side of the headlight, with each flange mounting a pair of links. The links are crossed over each other to intersect the slots and a bolt extended laterally through the point of intersection of the slots and into the tapped sidewall of the headlight. By tightening the bolts into the headlight, the fairing is fixed in the desired position.

The brace has a pair of spaced rods extending downwardly and rearwardly towards the clamping assembly. A clamp on each side of the handlebars has a substantially laterally extending lug with a transverse bore to receive the rods. The lug is rotatable to align the bore with the rod which it receives and is anchored in any desired position.

It is another object of the present invention to provide a fairing mounting that can be used on motorcycles having varying physical configurations. The clamping assembly can be moved along and anchored at any position on the handlebars. The fairing may be mounted on any motorcycle having handlebars and a headlight or like structure to which the forward mount can attach.

BRIEF DESCRIPTION OF THE DRAWINGS

FIG. 3 is a side elevation view of the motorcycle fairing partially broken away in the region of the mounting assembly and showing an alternate position for the fairing in phantom.

FIG. 4 is an enlarged view of a clamp used to mate a fairing brace with the motorcycle handlebars taken along line 4—4 of FIG. 3.

FIG. 5 is an exploded perspective view of the clamp on the opposite side of the handlebars from the clamp in FIG. 4.

DETAILED DESCRIPTION OF THE DRAWINGS

Figure 1:
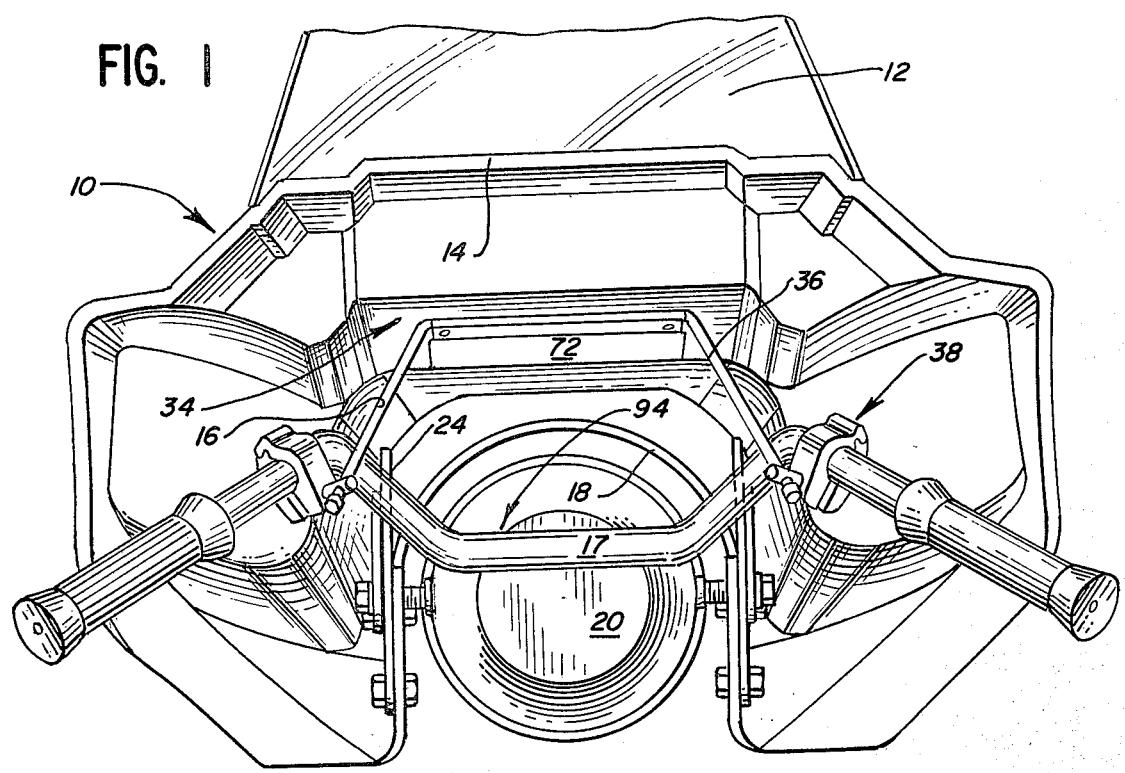
FIG. 1 is a rear elevation view of a motorcycle fairing incorporating the mounting assembly of the present invention.
Figure 2:
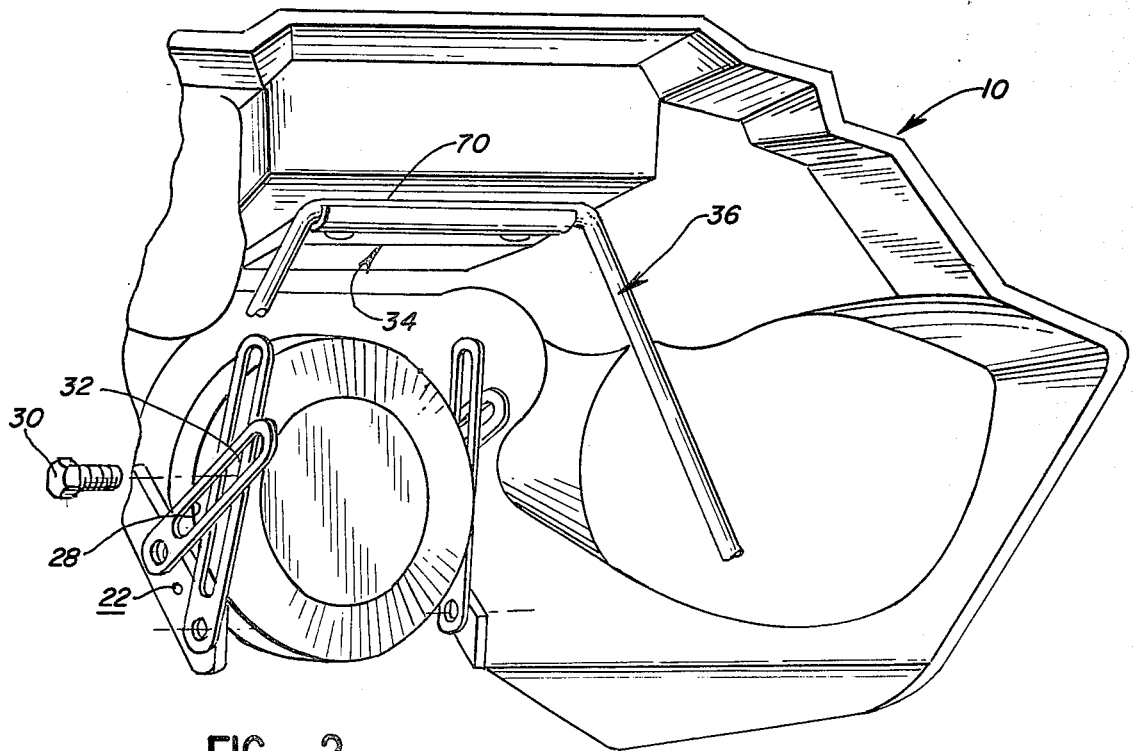
FIG. 2 is an enlarged, fragmentary, perspective view of the fairing in FIG. 1.

Referring initially to FIGS. 1-3, a motorcycle fairing is illustrated having a fiberglass body 10 and a windshield 12 secured appropriately to an upstanding ledge 14 formed at the upper region of the body 10. The body 10 has a substantially rounded outer surface defining a cup-shaped inner region 16 which is situated about the handlebars 17. A U-shaped cutout 18 in the lower region of the fairing accommodates a circular headlight 20 mounted at the front of the motorcycle (not shown), which cutout 18 is preferably made large enough so as not to limit adjusting movement of the fairing, as hereafter discussed, and to accommodate headlights of different diameter.

At the edges of the cutout 18, and on opposite sides of the headlight 20, are a pair of vertically projecting flanges 22, formed integrally with the body 10. A pair of mounting links 24,26 are secured adjacent their lower end, as by bolting, at longitudinally spaced positions along each flange 22. Each link 24,26 is of a flat, elongate construction with a longitudinal slot 28 extending substantially along its length. The links 24,26 are crossed over each other and a bolt 30 extended laterally through the point of coincidence of the slots and into a tapped bore 32 in the sidewall of the light 20. The bolts 30 extending within the sidewall on opposite sides of the light 20 are aligned in a common horizontal axis about which the fairing is rotatable. The crossed links on each side of the headlight, being adjustable relative to each other, and to the headlight, accommodate rotational movement of the fairing about the bolts 30 as well as accommodating movement of the fairing both fore and aft and vertically with respect to the motorcycle. With the fairing in the desired position, the bolts in the headlight and flanges 22 are tightened to fix the fairing position. The triangular arrangement of the bolts assures that the fairing is anchored securely against movement in all directions.

At the upper region, and towards the rear of the fairing, is a flat, downwardly facing ledge 34 to which is secured a U-shaped bracing member 36 which extends downwardly and rearwardly from the ledge 34 to engage a pair of clamps 38 mated with the handlebars 17. Each clamp 38, as seen in FIGS. 4 and 5, comprises first and second body halves 40 and 42, respectively, with each of the halves defining a curved region 44 at their midportion, which approximates the curvature of the handlebars and is designed to fit closely thereabout. At the top edge of the first body half 40 is a curved longitudinal groove 46 and an aligned protruding ridge 48 immediately inward therefrom. The upper portion of the second body half 42 has a correspondingly configured, depending ridge 50 and adjacent groove 52 to cooperatively receive, respectively, the groove 46 and ridge 48 of the first half.

With the first half 40 positioned on the outside of the handlebar 17, the second half is mated thereto by first introducing the ridge 50 on the second half to the groove 46 in the first half with the bottom of the second half disposed away from the first half. With the upper portion of the first and second halves mated, the lower portion of the second half is rotated outwardly to seat the curved region 44 of the second half against the handlebars 17.

As can be seen in FIG. 4, flat wall portions 54,56, respectively formed at the bottom of the first and second body halves, do not closely abut. This particular arrangement permits the clamp 38 to fit about handlebars of varying diameters. Further, this permits a modicum of flexing at the lower portion of the body halves, such that the corners 58 formed at the intersection of the walls 54,56 and the curved portion 44 of each body half will be drawn inwardly towards the handlebars 17 to more positively grasp the same when the body halves are secured.

The body halves are secured to each other by a laterally extending bolt 60, having a lock washer 62 fit within a circular recess 64 in the second body half 42. A cylindrical sleeve 66 is fit in an aligned recess in the first body half 40, which receives and is secured with the bolt 60. As the handlebars 17 are of a generally uniform thickness, the clamping assembly may be fixed at any position therealong.

The base 70 of the U-shaped brace 36 is held against the downwardly facing ledge 34 by a clamp plate 72. As can be seen most clearly in FIG. 3, the ledge 34 is stepped to define a first face 76 and a ledge 78 displaced upwardly and rearwardly therefrom, such that the ledges cooperatively define a rearwardly opening, laterally extending corner 80. The plate 72 has a main, rectangular portion 82 bolted to the first face 76 and an upwardly offset edge 84 curved to the configuration of the brace 36 and being so designed to capture the base 70 of the brace 36 within the corner in a manner that the brace 36 is free to pivot about the lateral base 70.

The brace 36 defines rod-like legs 86, which each extend through a bore 88 in an expanded head 90 on the nut 68 of the handlebar clamps. With the bolts in the links 24,26 loosened, the fairing can be oriented as desired. The bolt 60 on the clamp is likewise loosened that the clamp might be positioned and that the head 90 might be oriented to align with the legs 86 of the brace 36 in whatever attitude they might take.

In FIG. 3 are shown alternative positions for the fairing. The fairing can be pivoted forwardly as much as is allowed by the legs 86 of the brace 36. The extremeties of the legs 86 have an enlarged head 92 which abuts the head 90 of the nut 68 to keep the brace from pulling away from the clamp. The top of the fairing is free to pivot rearwardly, as shown in phantom, as far as is permitted before the inside wall of the fairing abuts the handlebars 17. Fore-and-aft and vertical movement is restricted by the triangular linkage formed by the bolts joining the mounting links 24,26 with the flange and headlight, with the brace 36 being free to pivot below the clamps into the central offset region 94 of the handlebars.

The above description was made for purposes of clarifying the above invention, with no unnecessary limitations to be derived therefrom.

We claim:

1. In a mounting for a fairing on a motorcycle having a steerable front wheel assembly with handlebars extending laterally therefrom and a headlight carried on the front wheel assembly between laterally spaced bolts defining a lateral axis, the improvement comprising:
   a pair of rods secured to an upper portion of the fairing and extending downwardly and rearwardly therefrom;
   a pair of clamps for connection with the motorcycle handlebars, said clamps receiving said rods, the length and orientation of the rods between the clamps and the fairing being adjustable; and
   means connecting a forward, lower portion of the fairing with said laterally spaced bolts, said means accommodating fore-and-aft movement of said fairing relative to said headlight so that said fairing can be adjustably positioned longitudinally relative to the headlight and rotation about said lateral axis of the fairing with respect to the headlight so that the fairing can be mounted on motorcycles having different configurations and is adjustable angularly with respect to the motorcycle.

2. In a mounting for a fairing on a motorcycle having a steerable front wheel assembly with handlebars extending laterally therefrom and a headlight carried on the front wheel assembly between laterally spaced bolts defining a lateral axis, the improvement comprising:
   means connecting a forward, lower portion of the fairing with said laterally spaced bolts, said means accommodating rotation about said lateral axis and displacement of the fairing with respect to the headlight whereby the fairing may be adjusted translationally and angularly with respect to the motorcycle;
   a pair of clamps for connection with the motorcycle handlebars; and
   a brace extending between a rearward portion of said fairing and said clamps, said brace engaging with and movable relative to said clamps to accommodate the range of positioning of the fairing afforded by said connecting means,
   said means including a first and second flat elongate link on each side of the headlight with a longitudinal slot in each link, said first and second links joined to the fairing pivotally about spaced horizontal axes about which said first and second links may be moved so that the slots intersect at a point, through which point of intersection the bolts extend to mate with said headlight and secure the links thereto.

3. In a mounting for a fairing on a motorcycle having a steerable front wheel assembly with handlebars extending laterally therefrom and a headlight carried on the front wheel assembly between laterally spaced bolts defining a lateral axis, the improvement comprising:
   a pair of rods secured to an upper portion of the fairing and extending downwardly and rearwardly therefrom;
   a pair of clamps for engagement with the motorcycle handlebars, said clamps receiving said rods, the length and orientation of the rods between the clamps and the fairing being adjustable; and
   means connecting a forward, lower portion of the fairing with aid laterally spaced bolts, said means accommodating rotation about said lateral axis of the fairing with respect to the headlight whereby the fairing can be mounted on motorcycles having different configurations and is adjustable angularly with respect to the motorcycle,
   said means comprising at least two links on each side of the headlight, with each said link having an elongate slot and being pivotally joined at an end to the fairing such that the links on each side of the light may be moved relative to each other so that the slots intersect along a portion of their length, through which intersecting portion the bolts may be extended and secured with the headlight to fix the fairing.

4. The fairing mounting of claim 3 wherein said fairing has an upstanding longitudinally directed flange on each side of the headlight and the ends of the links joined to the fairing are pivotally connected to said flange.

5. In a mounting for a fairing on a motorcycle having a steerable front wheel assembly with handlebars extending laterally therefrom, and a headlight carried on the front wheel assembly between laterally spaced bolts defining a lateral axis, the improvement comprising:

means connecting said fairing with said headlight, said means accommodating relative vertical movement of said fairing and headlight whereby the vertical position of the fairing upon the motorcycle can be varied, said connecting means comprising a plurality of joined links, with at least a first and second link pivotally joined to the fairing and with each other.

6. In a mounting for a fairing on a motorcycle having a steerable front wheel assembly with handlebars extending laterally therefrom and a headlight carried on the front wheel assembly between laterally spaced bolts defining a lateral axis, the improvement comprising:

a pair of rods secured to an upper portion of the fairing and extending downwardly and rearwardly therefrom;

a pair of clamps for engagement with the motorcycle handlebars, said clamps receiving said rods, the length and orientation of the rods between the clamps and the fairing being adjustable; and means connecting a forward, lower portion of the fairing with said laterally spaced bolts, said means accommodating fore-and-aft movement of said fairing relative to said headlight whereby said fairing can be repositioned longitudinally relative to the motorcycle, said means comprising at least two links on each side of the headlight, with each said link having an elongate slot and being pivotally joined at an end to the fairing such that the links on each side of the light may be moved relative to each other so that the slots intersect along a portion of their length, through which intersecting portion the bolts may be extended and secured with the headlight to fix the fairing.

7. In a mounting for a fairing on a motorcycle having a steerable front wheel assembly with handlebars extending laterally therefrom and a headlight carried on the front wheel assembly between laterally spaced bolts defining a lateral axis, the improvement comprising:

means connecting a forward, lower portion of the fairing with said laterally spaced bolts, said means accommodating rotation about said lateral axis and displacement of the fairing with respect to the headlight whereby the fairing may be adjusted translationally and angularly with respect to the motorcycle;

a pair of clamps for connection with the motorcycle handlebars; and a brace extending between a rearward portion of said fairing and said clamps, said brace engaging with and movable relative to said clamps to accommodate the range of positioning of the fairing afforded by said connecting means, said brace being U-shaped and having a base and a pair of rod-like legs extending therefrom in substantially the same plane, the mounting including means pivotally securing said base to said fairing.

8. The fairing mounting of claim 7 wherein each clamp comprises first and second body halves which are fit over the handlebars, and means joining said body halves with each other so as to fix the body halves in any desired position along the length of the handlebars.

9. The fairing mounting of claim 7 wherein said fairing has a downwardly facing surface and said pivotal securing means comprise a flat plate which captures said base and is secured to the downwardly facing surface of the fairing.

10. The fairing of claim 8 wherein said second body half has a lug extending laterally therefrom, and a transverse bore in said lug receives the legs of said U-shaped brace which are adjustably extensible within said bore as to vary the length of the legs between the fairing and the clamp.

11. The fairing of claim 9 wherein said fairing has a ledge displaced upwardly from said downwardly facing surface so as to define a laterally extending rearwardly opening corner, within which corner the base of the brace is received and maintained by said pivotal securing means.

12. The fairing of claim 10 wherein said joining means mates with said lug with said second body half such that the lug is rotatable about a laterally extending axis to permit orientation of the bore receiving the legs of the brace to accommodate the legs through the range of positions afforded by the connecting means.

13. The fairing of claim 11 wherein said flat plate extends longitudinally beyond said downwardly facing ledge and engages the base of the brace as to capture the base within said corner.

14. In a mounting for a fairing on a motorcycle having a steerable front wheel assembly with handlebars extending laterally therefrom, and a headlight carried on the front wheel assembly between laterally spaced bolts defining a lateral axis, the improvement comprising:

means connecting said fairing with said headlight, said means accommodating relative vertical movement of said fairing and headlight whereby the vertical position of the fairing upon the motorcycle can be varied.

15. The fairing mounting of claim 14 including a brace extending from the fairing to the handlebars and a clamp securing the brace to the handlebars.

16. The fairing mounting of claim 15 wherein said brace comprises a plurality of rods pivotally joined with the fairing and adjustably joined with the clamp to accommodate the fairing movement permitted by said connecting means.

* * * * *